United States Patent [19]
Paver

[11] Patent Number: 6,049,882
[45] Date of Patent: Apr. 11, 2000

[54] APPARATUS AND METHOD FOR REDUCING POWER CONSUMPTION IN A SELF-TIMED SYSTEM

[75] Inventor: Nigel C. Paver, Manchester, United Kingdom

[73] Assignees: LG Semicon Co., Ltd., Cheongju, Rep. of Korea; Cogency Technology Incorporated, Ontario, Canada

[21] Appl. No.: 08/997,329

[22] Filed: Dec. 23, 1997

[51] Int. Cl.[7] .................................................. G06F 1/32
[52] U.S. Cl. ............................................................. 713/322
[58] Field of Search .................................. 713/300–330

[56] References Cited

U.S. PATENT DOCUMENTS

| | | | |
|---|---|---|---|
| 4,837,740 | 6/1989 | Sutherland | 364/900 |
| 5,222,239 | 6/1993 | Rosch | 395/750 |
| 5,367,638 | 11/1994 | Niessen et al. | 395/250 |
| 5,452,401 | 9/1995 | Lin | 395/750 |
| 5,579,526 | 11/1996 | Watt | 395/800 |
| 5,887,178 | 3/1999 | Tsujimoto et al. | 395/750 |

FOREIGN PATENT DOCUMENTS

| | | |
|---|---|---|
| 0676686 A2 | 10/1995 | European Pat. Off. . |
| 0756224 A2 | 1/1997 | European Pat. Off. . |
| 0766167 A1 | 4/1997 | European Pat. Off. . |
| 0770952 A1 | 5/1997 | European Pat. Off. . |
| 2235797 | 3/1991 | United Kingdom . |
| WO 96/25701 A1 | 8/1996 | WIPO . |
| WO 97/24653 A1 | 7/1997 | WIPO . |

OTHER PUBLICATIONS

Gordon M. Jacobs et al.; "A Fully Asynchronous Digital Signal Processor Using Self–Timed Circuits;" IEEE Journal of Solid–State Circuits, vol. 25, No. 6, pp. 1526–1537.

*Primary Examiner*—Ayaz R. Sheikh
*Assistant Examiner*—David A. Wiley
*Attorney, Agent, or Firm*—Fleshner & Kim

[57] ABSTRACT

A power consumption control apparatus and method for an asynchronous system is provided that reduces power consumption by selecting one of a plurality of power consumption levels for the system. The power consumption levels can be determined based on work load requirements of the system and can be implemented for the system or portions thereof using a single block of the system. The asynchronous system includes a plurality of intercoupled functional units and a power control circuit coupled to a selected one of the plurality of functional units to determine at least one of a first and a second operating speed of a selected functional unit.

25 Claims, 5 Drawing Sheets

APPARATUS AND METHOD FOR REDUCING POWER CONSUMPTION IN A SELF-TIMED SYSTEM

BACKGROUND OF THE INVENTION

1. Field of the Invention

This invention is directed to a power reduction apparatus, and in particular, to a self-timed power reduction apparatus that reduces power consumption.

2. Background of the Related Art

A processor such as a microprocessor, micro controller or a digital signal processor (DSP) processor includes of a plurality of functional units, each with a specific task, coupled with a set of binary encoded instructions that define operations on the functional units within the processor architecture. The binary encoded instructions can then be combined to form a program that performs some given task. Such programs can be executed on the processor architecture or stored in memory for subsequent execution.

To operate a given program, the functional units within the processor architecture must be synchronized to ensure correct (e.g., time, order, etc.) execution of instructions. "Synchronous" systems apply a fixed time step signal (i.e., a clock signal) to the functional units to ensure synchronized execution. Thus, in related art synchronous systems, all the functional units require a clock signal. However, not all functional units need be in operation for a given instruction type. Since the functional units can be activated even when unnecessary for a given instruction execution, synchronous systems can be inefficient.

The use of a fixed time clock signal (i.e., a clock cycle) in synchronous systems also restricts the design of the functional units. Each functional unit must be designed to perform its worst case operation within the clock cycle even though the worst case operation may be rare. Worst case operational design reduces performance of synchronous systems, especially where the typical case operation executes much faster than that of the worst case criteria. Accordingly, synchronous systems attempt to reduce the clock cycle to minimize the performance penalties caused by worst case operation criteria. Reducing the clock cycle below worst case criteria requires increasingly complex control systems or increasingly complex functional units. These more complex synchronous systems reduce efficiency in terms of area and power consumption to meet a given performance criteria such as reduced clock cycles.

Related art self-timed systems, also known as asynchronous systems, remove many problems associated with the clock signal of synchronous systems. Accordingly, in asynchronous systems, performance penalties only occur in an actual (rare) worst case operation. Accordingly, asynchronous systems can be tailored for typical case performance, which can result in decreased complexity for processor implementations that achieve the performance requirements. Further, because asynchronous systems only activate functional units when required for the given instruction type, efficiency is increased. Thus, asynchronous systems can provide increased efficiency in terms of integration and power consumption.

A related art asynchronous systems use functional units having an asynchronous interface protocol to pass data and control information. By coupling such asynchronous functional units together to form larger blocks, increasingly complex functions can be realized. FIG. 1 shows two such functional units coupled via data lines and control lines. A first functional unit 100 is a sender, which passes data. The second functional unit 102 is a receiver, which receives the data.

Communication between the functional units 100, 102 is achieved by bundling data wires 104 with control wires. A request control wire REQ is controlled by the sender 100 and is activated when the sender 100 has placed valid data on the data wires 104. An acknowledge control wire ACK is controlled by the receiver 102 and is activated when the receiver 102 has consumed the data that was placed on the data wires 104. This asynchronous interface protocol is known as a "handshake" because the sender 100 and the receiver 102 both communicate with each other to pass the bundled data.

The asynchronous interface protocol shown in FIG. 1 can use various timing protocols for data communication. One related art protocol is based on a 4-phase control communication scheme. FIG. 2 shows a timing diagram for the 4-phase control communication scheme.

As shown in FIG. 2, the sender 100 indicates that the data on the data wires 104 is valid by generating an active request control wire REQ high. The receiver 102 can now use the data as required. When the receiver 102 no longer requires the data, it signals back to the sender 100 an active acknowledge control wire ACK high. The sender 100 can now remove the data from the communication bus such as the data wires 104 and prepare the next communication.

In the 4-phase protocol, the control lines must be returned to the initial state. Accordingly, the sender 100 deactivates the output request by returning the request control wire REQ low. On the deactivation of the request control wire REQ, the receiver 102 can deactivate the acknowledge control wire ACK low to indicate to the sender 100 that the receiver 102 is ready for more data. The sender 100 and the receiver 102 must follow this strict ordering of events to communicate in the 4-phase control communication scheme. Beneficially however, there is no upper bound on the delays between consecutive events.

A first-in first-out (FIFO) register or pipeline provides an example of self-timed systems that couple together a number of functional units. FIG. 3 shows such a self-timed FIFO structure. The functional units can be registers 300a–300c with both an input interface protocol and an output interface protocol. When empty, each of the registers 300a–300c can receive data via an input interface 302 for storage. Once data is stored in the register, the input interface cannot accept more data. In this condition, the register 300a input has "stalled". The register 300a remains stalled until the register 300a is again empty. However, once the register 300a contains data, the register 300a can pass the data to the next stage (i.e., register) of the self-timed FIFO structure via an output interface 304. The registers 300a generates an output request when the data to be output is valid. Once the data has been consumed and the data is no longer required, the register 300a is then in the empty state. Accordingly, the register 300a can again receive data using the input interface protocol.

Chaining the registers 300a–300c together by coupling the output interface 304 to the input interface 302 forms the multiple stage FIFO or pipeline. Thus, an output interface request and acknowledge signals, Rout and A out, are respectfully coupled to the following register 300a–300c (stage) input interface request and acknowledge signals, Rin and Ain. As shown in FIG. 3, data passed into a FIFO input 306 will be passed from register 300a to register 300c to eventually emerge at a FIFO output 308. Thus, data ordering is preserved as the data is sequentially passed along the FIFO. The FIFO structure shown in FIG. 3 can use the 4-phase control communication scheme shown in FIG. 2 as the input and output interface protocol.

The FIFO register of FIG. 3 can include logic processing. In this case, data passes through processing logic between stages of the FIFO register. As shown in FIG. 4, data passes through processing logic 402a–402b between registers 300a–300c. Since the processing logic 402a–402b takes time to determine an output value, control signals (e.g., the output interface request signal Rout) are delayed to corresponding match the logic delay. The coordinated control signal delay and processing logic delay ensures the 4-phase communication protocol is satisfied. In other words, the data arrives and then the request Rout signals its validity.

As shown in FIG. 4, the delay in the request path lengthens the time taken for the handshake to complete, which allows the data computation in the processing logic to complete. The control signal delay can be any value that is appropriate to match the logic data delay. Further, the delay 404a–404b can be variously implemented. For example, a simple matched path, a variable delay or function of the data presented can be used as the delay 404a–404b. However, an increase in the delay reduces the throughput and performance of the self-timed system because a delay in the handshake request/acknowledge loop decreases the data transfer rate.

An object of the present invention is to substantially obviate the above described problems and disadvantages of the prior art.

Another object of the present invention is to reduce the power consumption of a semiconductor device.

A further object of the present invention is reduce power consumption of an asynchronous system by determining an operational speed based on load requirements.

In order to achieve at least the above objects in a whole or in part, there is provided an asynchronous system according to the present invention that includes a plurality of functional units intercoupled to perform at least one task and a power control circuit coupled to a selected one of the plurality of functional units to determine at least one of a first and a second operating speed of the selected functional unit.

To further achieve the above objects in a whole or in part, there is provided a data processing apparatus according to the present invention that includes a plurality of functional units, an asynchronous controller that decodes a current instruction to perform a corresponding instruction task using a group of the plurality of functional units, a power determination device, wherein the data processing apparatus operates at one of a plurality of power levels selected by the power determination device and a communication device coupling the functional units, the power determination device and the controller.

To further achieve the above objects in a whole or in part, there is provided a method for operating an asynchronous system having a plurality of intercoupled functional units according to the present invention that includes determining an operating criteria of the asynchronous system and determining one of a plurality of a power consumption levels based on the operating criteria of the asynchronous system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 5:
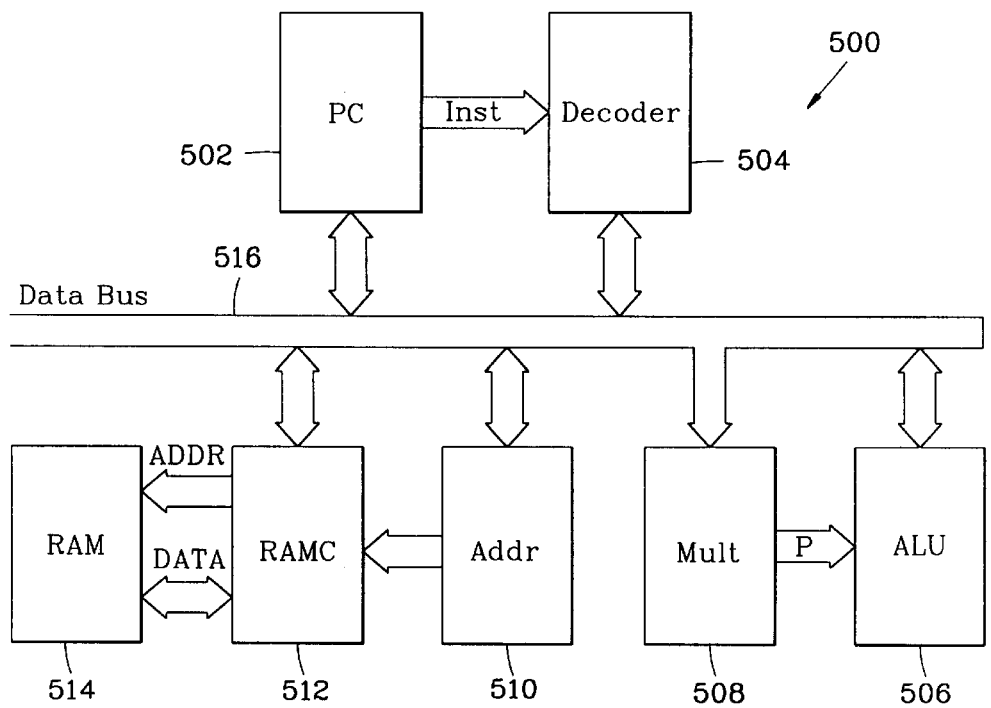
FIG. 5 is a block diagram showing a digital processor.

System performance (e.g., throughout) of a self-timed system can be controlled by the speed of critical elements. A critical element performs a task that must be completed before the self-timed system continues processing. For example, in a digital processor a critical element can be an instruction fetch. An exemplary digital processor 500 architecture is shown in FIG. 5. The processor 500 architecture includes functional units, that can be used in a microprocessor, a micro controller and DSP implementations or the like. To implement a program on a processor architecture such as the processor 500, a set of instructions and corresponding instruction tasks must be defined. During operations, each instruction is decoded to activate the functional units required to perform the corresponding instruction task. Each of functional units are coupled by a common resource data bus 516.

A program counter functional unit PC 502 generates an instruction program address. The PC 502 can include an address stack for holding addresses on subroutine or interrupt calls. An instruction decoder functional unit 504 controls instruction fetch and decode. The instruction decoder functional unit 504 contains an instruction decoder for generating control information for the functional units and a status register for holding current process status. An arithmetic and logic functional unit ALU 506 performs data and arithmetic operations using an integer arithmetic ALU. The ALU 506 also contains a data accumulator for storing a result of a specific data or arithmetic operation.

The processor 500 can further include a multiplier functional unit MULT 508 that performs data multiplication and an indirect address register functional unit ADDR 510. The ADDR 510 holds indirect data addresses in an address register array. A Random Access Memory functional unit RAM 514 is used to store data values. A data RAM control functional unit RAMC 512 controls memory access for data memory in the RAM 514.

Figure 6:
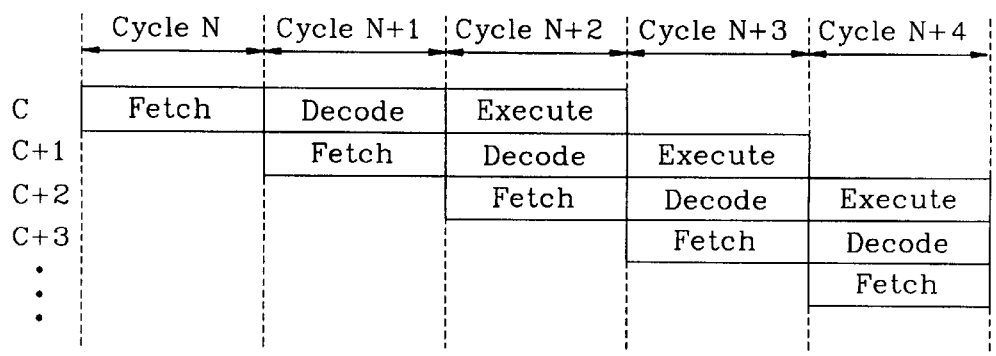
FIG. 6 is a diagram showing operations of an instruction pipeline.

In the processor 500, the functional blocks can operate concurrently. However, the processor 500 must ensure correct management of the common resource data bus 516 by controlling data and sequence requirements when communications occur between functional units. The processor 500 preferably uses a 3-stage instruction pipeline composed of instruction fetch, instruction decode and instruction execute cycles. A pipelined architecture improves performance requirements by allowing more efficient (e.g., concurrent) use of the functional units of the processor 500. As show in FIG. 6, the 3 stage instruction pipeline allows each pipelined stage to be overlapped, which increases concurrency and processor performance.

Figure 1:
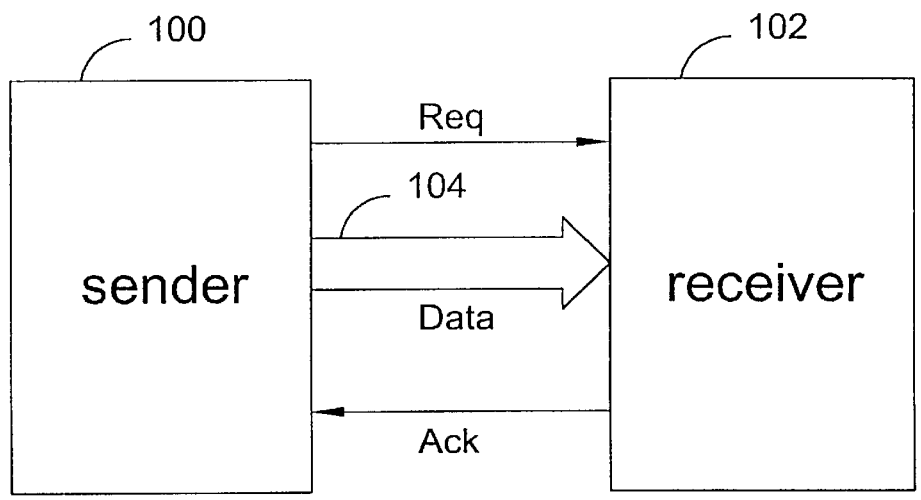
FIG. 1 is a block diagram showing a self-timed data interface.
Figure 2:
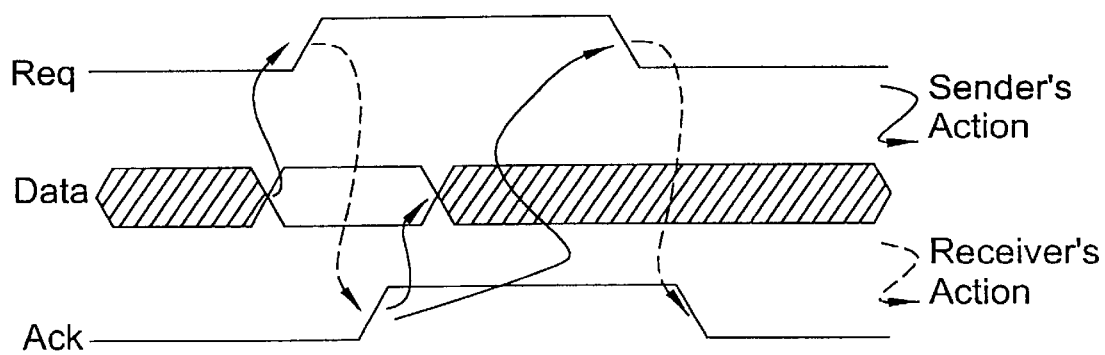
FIG. 2 is a diagram showing signal waveforms of a four-phase communication protocol.
Figure 3:
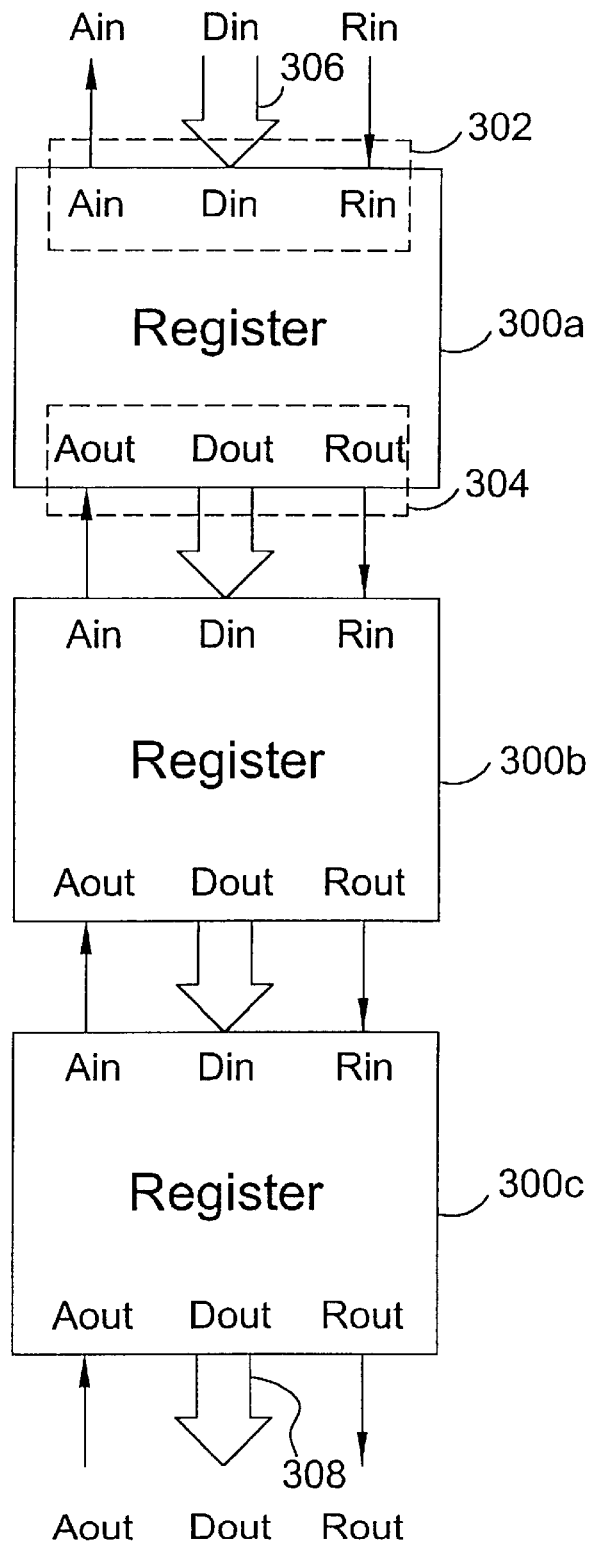
FIG. 3 is a block diagram showing a self-timed first-in-first-out (FIFO) data interface.
Figure 4:
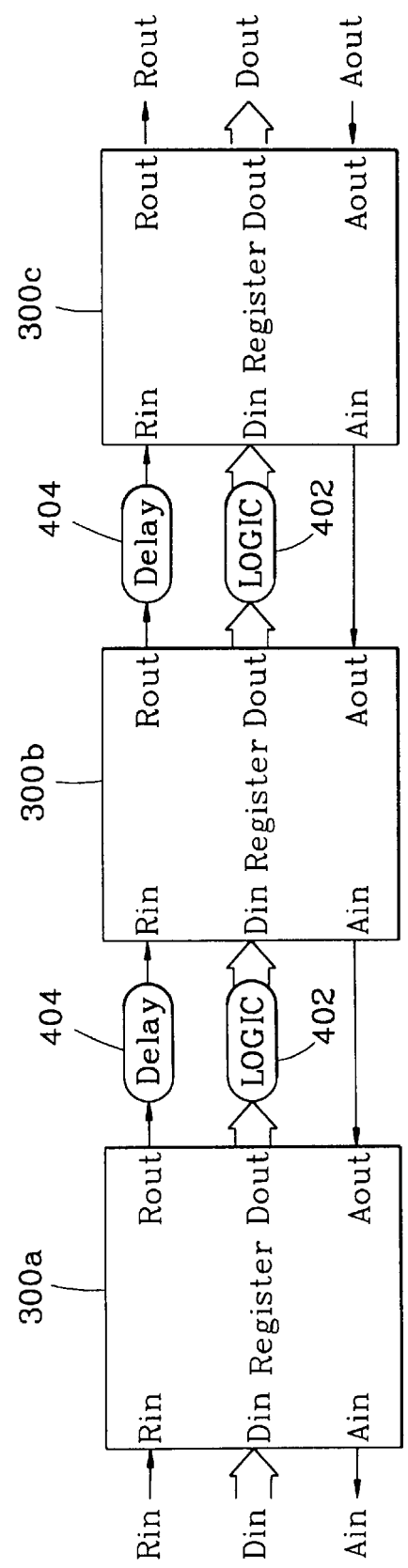
FIG. 4 is a block diagram showing a FIFO interface including processing and control logic.
Figure 7:
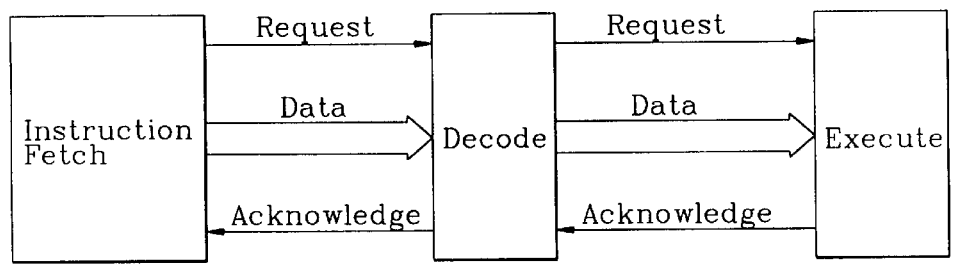
FIG. 7 is a block diagram showing a self-timed processor.

FIG. 7 shows the example of the instruction fetch being the critical element in an asynchronous system. As illustrated, FIG. 7 is similar to FIG. 4, however, the register, logic and matched delay are grouped together as a single pipeline stage. In self-timed systems, the system speed can be reduced by changing the performance (cycle-time) of a critical functional unit because the handshake in each functional unit must complete before the next item can be accepted. Similarly, for example, the system performance of the processor 500 can be reduced by increasing the delay of instruction fetch by the Decoder 504 (i.e., the processor can only process instructions as fast as they are delivered). Thus, self-timing can be used to control a circuit, sub-system or system throughput by changing the operating speed of one functional unit.

In contrast, system performance of synchronous systems is controlled by the clock. Thus, in a synchronous system, the speed of the system cannot be controlled using the speed of one functional unit because the clock governs the system speed. Accordingly, to slow the synchronous system, every functional unit in the synchronous system must be slowed.

In a semiconductor device, and in particular, in CMOS integrated circuit technology, power consumption is proportional to frequency of operation. In other words, for a given circuit the higher the frequency of operation, the higher the power consumption. The power consumption can be determined by the following equation:

$$E = \tfrac{1}{2} CV^2 \times \text{frequency} \tag{1}$$

In the above equation, E=energy, C=capacitance, V=voltage and frequency=1/cycle time.

In self-timed systems, when the cycle time is increased, the frequency and the power consumption are reduced. Therefore, according to preferred embodiments of the present invention, power consumption of a self-timed system can be controlled by adjusting the cycle time of a critical functional unit or element of the system.

Using the above-described example of instruction fetch, the processor executes priority work at a first speed or full speed. However, when the processor is idling (e.g. busy waiting), then the processor executes at a second speed or reduced speed. Accordingly, the system performance is reduced at the second speed by increasing the cycle time of the instruction fetch stage. Consequently, the self-timed system power consumption is reduced at the second speed.

Figure 8:
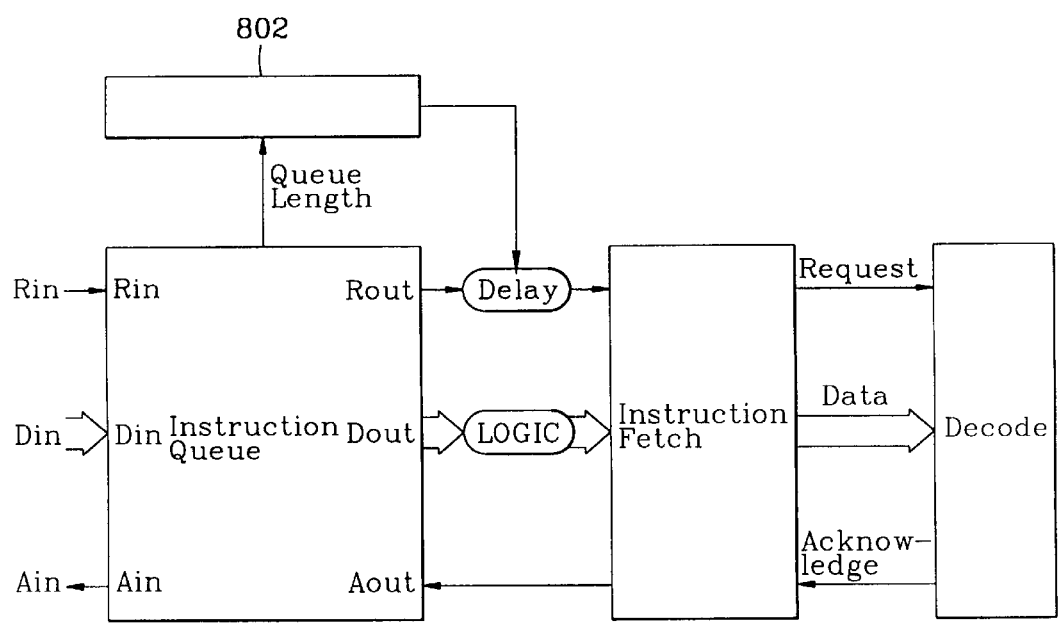
FIG. 8 is a block diagram of a preferred embodiment of a processor interface with control logic.

FIG. 8 shows an arrangement for adjusting power consumption for a self-timed processor according to a first preferred embodiment of the present invention. As shown in FIG. 8, a variable cycle time that is used to control power consumption is based on an instruction queue length. A power control device 802 dynamically adjusts the system performance (e.g., cycle time) and power consumption depending on work load requirements. In the first preferred embodiment, the system performance adjustment is achieved by changing a variable delay in one processing stage (e.g. instruction fetch).

As shown in FIG. 8, an instruction queue length is used to indicate the processor work load requirements. A counter is used to count the number of elements (e.g., instructions) waiting in a queue to be processed. The variable cycle time is then controlled by the power control device 802 as a function of queue length. As the "queue length" gets longer and there is more work to do, the delay (e.g., cycle time) is reduced. Accordingly, the system power consumption and system performance is increased. As the "queue length" of work becomes smaller, the cycle time is increased to decrease the power consumption and the system performance. Thus, power consumption corresponds to the amount of work (e.g., execution requirements of the processor) to be done.

Thus, in a self-timed system, the speed of operation can be controlled by controlling one part of the system. In FIG. 7, the cycle time of a sub-block or sub-system can be increased by increasing the delay in the handshake loop. Thus, the first preferred embodiment monitors instruction queue length to reduce power consumption of the self-timed system. Further, the control structure can be easily implemented.

Alternative preferred embodiments utilize various apparatus and methods to monitor system work load requirements to reduce power consumption. A second preferred embodiment according to the present invention uses an explicit request to reduce the power consumption. The request can be implemented using, for example, an instruction executed in the system or a specific value on an external input such as an external pin for the system. Further, the external pin can be user accessible.

A third preferred embodiment according to the present invention uses the activation of particular functional units to control the power consumption. For example, a processor can be controlled to speed up or slow down based on a particular functional unit (e.g. a multiplier functional unit may require faster operation).

As described above, the preferred embodiments of the presentation control system power consumption using a variable delay in a functional unit to link cycle time to some measure of system load. However, the present invention is not intended to be limited to these embodiments. Various alternative indications of work load requirements such as application specific load indicators can be used to control the cycle time.

As well as controlling overall system performance, a fourth preferred embodiment according to the present invention controls power consumption of one or more individual sub-circuits or sub-systems of an asynchronous system. In the fourth preferred embodiment, one variable delay unit is required per sub-system. The fourth preferred embodiment allows specific parts of the system to reduce power consumption relative to other parts of the system. In this manner, a first functional unit of a plurality of functional units in the system can selectively reduce its power consumption by executing at a lower priority than the remaining functional units.

As described above, the preferred embodiments have various advantages. The preferred embodiments reduce power consumption of asynchronous systems. For example, portable equipment, where power consumption (e.g., battery life) is directly related to potential length of use, can be used for relatively longer periods. Further, the power consumption level can be selectively implemented based on priority, system work load requirements or the like. In addition, various sub-systems can be operated at different power consumption levels.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An asynchronous system, comprising:
   a plurality of functional units intercoupled to perform at least one task;
   an asynchronous control structure that executes a plurality of instructions using self-timing initiation by request signals and self-timing completion by acknowledgment signals to control operation of the functional units; and
   a power control circuit coupled to a selected one of the plurality of functional units to determine at least one of a first and a second operating speed of the selected functional unit, wherein the operating speed of the selected functional unit determines an operating speed of the asynchronous system.

2. The asynchronous system of claim 1, wherein the asynchronous system consumes less power when the selected functional unit operates at the second operating speed relative to when the selected functional unit operates at the first operating speed.

3. The asynchronous system of claim 1, wherein the first and second operation speeds are determined based on at least one of instruction queue length, an instruction, an external signal and an application specific criteria.

4. The asynchronous system of claim 1, wherein the power control circuit selects a variable speed of operation for the selected functional unit.

5. The asynchronous system of claim 4, wherein the power control circuit selects the variable speed of operation based on at least one of instruction queue length, an instruction, an external signal and an application specific criteria.

6. The asynchronous system of claim 1, wherein the operating speed is a functional unit operation cycle time, wherein the cycle time is the inverse of a frequency of operation, and wherein the period of operation for the selected functional unit is proportional to an instruction queue length.

7. The asynchronous system of claim 6, wherein the cycle time is based on at least one of an input protocol delay and an output protocol delay.

8. The asynchronous system of claim 1, wherein the plurality of functional units is divided into a plurality of groups of functional units, and wherein the power control circuit comprises a plurality of power control units that each correspond to one of the group of functional units, and wherein each of the power control units sets a variable operating speed for the corresponding one of the groups of functional units using a designated functional unit in each of the groups of functional units.

9. The asynchronous system of claim 1, wherein the operating speed of the selected functional unit determines power consumption of a sub-system of the asynchronous system.

10. A data processing apparatus, comprising:
    a plurality of functional units;
    an asynchronous controller that decodes a current instruction to perform a corresponding instruction task using a group of the plurality of functional units, wherein an asynchronous control structure executes the current instruction using self-timing initiation by request signals and self-timing completion by acknowledgment signals to control operation of the group of the functional units;
    a power determination device, wherein the data processing apparatus operates at one of a plurality of power levels selected by the power determination device; and
    a communication device coupling the functional units, the power determination device and the controller, wherein power determination device modifies a cycle time without a clock signal.

11. The data processing apparatus of claim 10, wherein the cycle time is at least one of a selected functional unit cycle time and the asynchronous controller cycle time.

12. The data processing apparatus of claim 10, wherein a selected power level is based on at least one of instruction queue length, an instruction, and external signal and an application specific criteria.

13. The data processing apparatus of claim 10, wherein the power determination device is coupled to a selected one of the plurality of functional units to determine at least one of first and second operating speeds of the selected functional unit.

14. The data processing apparatus of claim 13, wherein when the selected functional unit operates at the second operating speed, the data processing apparatus consumes less power relative to the first operating speed.

15. The data processing apparatus of claim 10, wherein the selected power level modifies a period of operation of the asynchronous control structure.

16. The data processing apparatus of claim 10, wherein the power determination device controls power consumption for a portion of the data processing apparatus.

17. The data processing apparatus of claim 10, further comprising a plurality of power determination devices.

18. The data processing apparatus of claim 10, wherein the controller uses a three-stage instruction pipeline and a four phase communication protocol, wherein the plurality of functional units includes at least one of a program counter unit, an instruction decoder unit, an arithmetic and logic unit, a multiplier unit, an indirect address register unit and a data storage unit, and wherein the communications device is a data bus.

19. A method of operating an asynchronous system having a plurality of intercoupled functional units, the method comprising:
    executing a instruction using an asynchronous control structure that implements self-timing initiation by request signals and self-timing completion by acknowledgment signals for the functional units to self-time each operation period of the asynchronous system;
    determining an operating criteria of the asynchronous system; and
    determining one of a plurality of a power consumption levels based on the operating criteria of the asynchronous system, wherein an execution speed of the asynchronous system is based on the power consumption level without using a clock signal.

20. The method of claim 19, wherein the determining an operating criteria step comprises determining work load requirements of the asynchronous system, and wherein the determining one of a plurality of a power consumption levels variably modifies the operation period proportional to the work load requirements.

21. The method of claim 19, wherein the determining one of a plurality of power consumption levels step comprises:

determining an operating speed for a selected one of the functional units.

22. The method of claim 21, wherein the operating speed of the selected functional unit determines the operating speed of the asynchronous system.

23. The method of claim 22, wherein the selected functional unit is an instruction decode functional unit.

24. The method of claim 21, wherein the operating speed of the selected functional unit determines a power consumption level of only a sub-system of the asynchronous system.

25. The method of claim 19, wherein operating criteria are based on determining at least one of an instruction queue length, an instruction type, an external signal type and a functional unit type.

* * * * *